March 2, 1971 C. G. RINGWALL ET AL 3,566,689

FLUIDIC TEMPERATURE SENSOR SYSTEM

Filed Oct. 17, 1968 4 Sheets-Sheet 1

Inventors:
Carl G. Ringwall,
Lonny R. Kelley,
by Louis A. Moncha

March 2, 1971  C. G. RINGWALL ET AL  3,566,689
FLUIDIC TEMPERATURE SENSOR SYSTEM
Filed Oct. 17, 1968  4 Sheets-Sheet 2

Inventors:
Carl G. Ringwall,
Lonny R. Kelley.
by Louis A. Moucha

March 2, 1971     C. G. RINGWALL ET AL     3,566,689

FLUIDIC TEMPERATURE SENSOR SYSTEM

Filed Oct. 17, 1968     4 Sheets-Sheet 3

Inventors:
Carl G. Ringwall,
Lonny R. Kelley,
by Louis A. Moucha

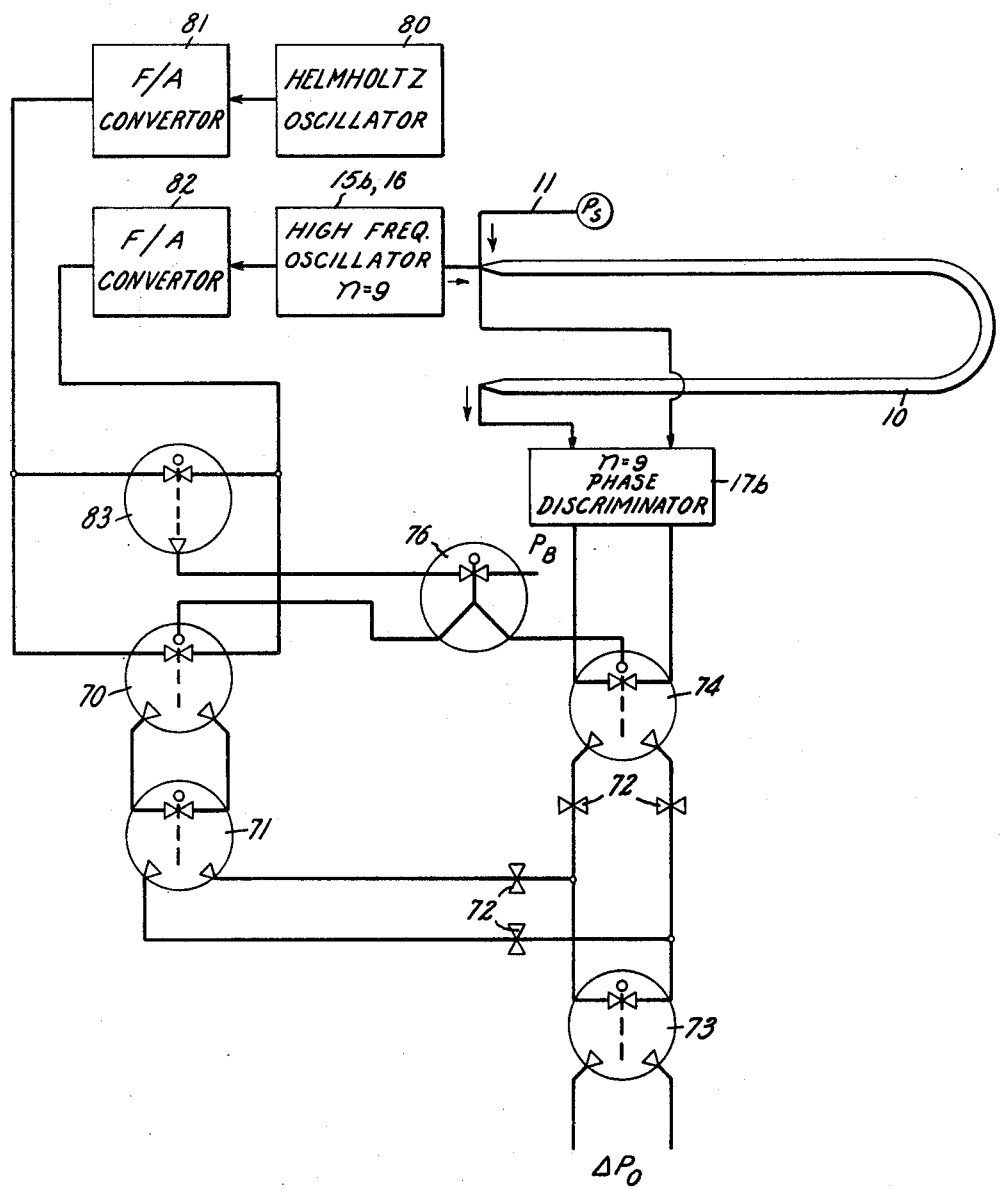

United States Patent Office 3,566,689
Patented Mar. 2, 1971

3,566,689
FLUIDIC TEMPERATURE SENSOR SYSTEM
Carl G. Ringwall, Scotia, and Lonny R. Kelley, Ballston Lake, N.Y., assignors to General Electric Company
Filed Oct. 17, 1968, Ser. No. 768,423
Int. Cl. G01k 1/16, 11/24
U.S. Cl. 73—339                            17 Claims

ABSTRACT OF THE DISCLOSURE

A fluidic temperature sensing system adapted for measuring an average temperature in a relatively large region utilizes the phase shift characteristic of a long fluid transmission line. A temperature sensing tube and preheater tube are arranged in a region whose temperature is to be measured and a variably pressurized fluid is circulated through the sensor tube. The fluid at the input end of the sensor tube is excited by a constant frequency fluidic oscillator to provide the pressure variation, and a fluidic phase discriminator is connected across the tube for detecting a phase shift of the pressure wave in its transmission through the sensor tube. The phase shift across the sensor tube of fixed length is proportional to the absolute temperature of the fluid within the tube, and if the tube is exposed to varying temperature the phase shift represents an average temperature.

---

Our invention relates to a sensor having no moving mechanical parts for measuring average temperature, and in particular, to a fluidic temperature sensing system utilizing the phase shift characteristics of a variably pressurized fluid signal passing through a long tube heated by the medium being temperature sensed.

The sensing of temperature is a vital function in many applications such as in a temperature control loop for aircraft gas turbine engines, for measuring the exhaust temperature in land based gas turbines, and for measuring a furnace temperature.

Electronic components are capable of measuring temperatures but have the disadvantage of limitation in operation to ambient temperatures below approximately 350° F. Operation above such temperature requires cooling means for the electronic components and the attendant higher costs in money and space. Electronic and other types of temperature sensors are practical in measuring the temperature of only a very small region and thus are incapable of providing an accurate measurement of large regions such as the exhaust plenum of a large gas turbine engine. Finally, other known fluidic temperature sensors are subject to contamination due to the fluid therein including the combustion by-products in the gas turbine exhaust resulting in reduced reliability of the sensor.

Therefore, one of the principal objects of our invention is to provide a temperature sensor substantially immune from contamination by combustion by-products.

Another object of our invention is to provide a temperature sensing system of simple construction and high reliability.

A further object of our invention is to provide a fluidic temperature sensor having no moving mechanical parts and adapted for measuring an average temperature in a relatively large region.

Another object of our invention is to provide a fluidic temperature sensor adapted for measuring high temperatures limited only by the materials available for the fabrication of the sensor.

Briefly summarized, our invention is a fluidic system adapted for measuring the average temperature in a relatively large region such as the exhaust plenum of a large gas turbine engine. A relatively long temperature sensing tube and preheater tube are disposed in the medium whose temperature is to be measured, and heat transfer to the tube walls raises the temperature thereof to essentially the temperature of the surrounding medium. A constant pressurized fluid is supplied to the input of the preheater tube, the output thereof being connected to the sensing tube. The input to the sensing tube is also supplied from a fluidic oscillator with a constant frequency sinusoidal pressure signal which is superimposed on the constant pressure fluid flow therein to produce a sinusoidally varying pressurized fluid flow through the sensing tube. A fluidic phase discriminator circuit connected across the two ends of the sensing tube detects a phase shift of the pressure wave in its transmission through the sensing tube. The phase discriminator has the characteristic of providing a zero differential output pressure (system null) whenever a 90° phase shift or odd multiple thereof occurs across the sensing tube. The null is established for a reference temperature by proper selection of the length of the sensing tube and the oscillator frequency. Deviation of the temperature of the surrounding medium from the reference temperature is indicated by an output pressure of the phase discriminator which is proportional to the phase difference from 90°. The temperature sensor accuracy or sensitivity can be increased by utilizing a large total phase shift through the sensing tube (i.e., large values of odd multiples of 90°), but at the expense of a decreased temperature range of operation. A dual mode temperature sensing system obtains both the high sensitivity and broad temperature range. Since the fluid utilized in the various tubes and circuitry are isolated from the medium whose temperature is to be measured, our temperature sensor is immune from contamination by environments such as combustion by-products.

The features of our invention which we desire to protect herein are pointed out with particularity in the appended claims. The invention itself, however, both as to its organization and method of operation, together with further objects and advantages thereof may best be understood by reference to the following description taken in connection with the accompanying drawings wherein:

FIG. 8 is a schematic representation of a fast response fluidic temperature sensing system constructed in accordance with our invention.

Figure 1:
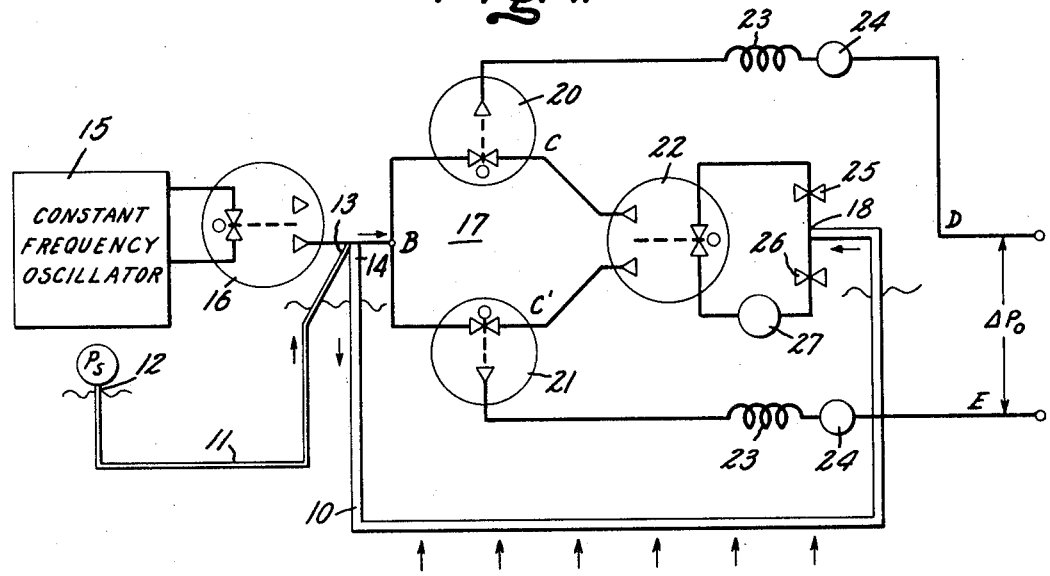
FIG. 1 is a schematic representation of a single mode fluidic temperature sensing system constructed in accordance with our invention.

Referring now in particular to FIG. 1, there is shown a schematic diagram of a single mode fluidic system for measuring average temperature. The temperature sensing element is a tube 10 of known length sufficient to traverse a region whose average temperature is to be measured, and is constructed of a material suitable for the medium in the region being monitored as well as for the fluid transmitted through the tube. A preheater tube 11 is also immersed in the medium (indicated by wavey lines) whose temperature is to be measured, a first end 12 thereof connected to a source $P_s$ of constant pressurized fluid such as air, or water. The second end 13 of tube 11 is connected to a first end 14 of tube 10, and tube 11 is of sufficient length to raise the temperature of the constant pressurized fluid therein by heat transfer to essentially that of the surrounding medium before passing into the sensing tube 10. Thus, the temperature of the fluid in sensing tube 10 is independent of its initial temperature.

The sinusoidally alternating pressurized output of a temperature-insensitive constant frequency fluidic oscillator 15 is also supplied to the juncture of tubes 10 and 11 for providing a constant frequency excitation superimposed on the constant pressure level fluid flow obtained from tube 11. The direction of pressure wave travel in the various elements is indicated by single arrows. The heat transfer from the surrounding medium to sensor tube 10 is indicated by the parallel arrows. The pressurized fluid output of the oscillator should be of the same type as the fluid within tube 11. The amplitude of the sinusoidal alternating pressure component must be maintained sufficiently small such that the magnitude of the pressure (i.e., the minimum pressure) is always above ambient. The fluidic oscillator output is applied to both tube 10 and a phase discriminator to be hereinafter described, and since the power level of the oscillator output is generally not sufficiently high for such purposes, a fluid amplifier of the active, analog type and characterized as a power or drive amplifier 16 is connected between the oscillator output and input end 14 of tube 10. Power amplifier 16 is a conventional two-receiver device wherein only one receiver is used as an output, the other receiver being vented. All of the hereinafter disclosed fluid amplifiers will be of the active, analog type except when specifically described as being to the contrary Fluidic oscillator 15 may comprise any of a number of known fluidic oscillator circuits such as a tuning fork oscillator which provide a constant frequency output.

A fluidic phase discriminator circuit indicated as a whole by numeral 17 is utilized for comparing the phase of the excitation signal supplied to the input end 14 of sensing tube 10 and at the second end 18 thereof. The phase shift across a tube of fixed length which is excited with a constant frequency signal is proportional to the velocity of propagation of the pressure wave within the tube. The wave speed is proportional to the square root of the absolute temperature. Thus, if the sensing tube 10 is exposed to varying temperatures along its length, the time for the pressure wave to traverse the length of the tube represents an average velocity and therefore an average temperature.

The phase shift $\phi$ across the length of a tube having input resistance $R_1$, output resistance $R_2$ and a characteristic line impedance $Z_c$ is:

$$\phi = \tan^{-1}\left\{\left[\frac{Z_c + \frac{R_1 R_2}{Z_c}}{R_1 + R_2}\right] \tan D\omega\right\} \quad (1)$$

where
$\omega$ is the frequency of the exciting pressure wave, and
$D$ is the delay time of the tube where:

$$D = \frac{\text{line length}}{\text{sonic velocity}} = \frac{l}{\sqrt{\lambda g R T}} \quad (2)$$

and $l$ is the length of the tube,
$\lambda$ is the ratio of specific heats,
$g$ is the acceleration of gravity
$R$ is the gas constant, and
$T$ is the absolute temperature in degrees R.

Let:

$$K = \frac{1}{\sqrt{\lambda g R}} \quad (3)$$

whereby Equation 2 reduces to:

$$D = \frac{Kl}{\sqrt{T}} \quad (4)$$

Also, let $$K_1 = \left[\frac{Z_c + \frac{R_1 R_2}{Z_c}}{R_1 + R_2}\right] \quad (5)$$

whereby Equation 1 reduces to $$\phi = \tan^{-1}\left[K_1 \tan\left(\frac{Kl\omega}{\sqrt{T}}\right)\right] \quad (6)$$

Phase discriminator 17 which measures the phase shift $\phi$ across tube 10 has the characteristic of providing a zero differential output pressure (system null) whenever a 90° (or odd multiple thereof) phase shift occurs across the sensing tube 10. From Equation 6, $\phi$ null ($\phi_n$) is independent of $K_1$ whenever Equation 7 is satisfied:

$$\phi_n = n\frac{\pi}{2} = \frac{Kl\omega}{\sqrt{T}} \quad (7)$$

and $n = 1, 3, 5, \ldots$ This system null conditions for a selected or reference temperature T is established by the proper selection of the length ($l$) of sensing tube 10 and the excitation frequency ($\omega$) of oscillator 15. Differentiating Equation 6 obtains:

$$\frac{\Delta\phi}{\Delta T} = \frac{K_1 Kl\omega}{2T^{3/2}} \frac{\sec^2 \frac{Kl\omega}{\sqrt{T}}}{\left[l + K_1^2 \tan^2 \frac{Kl\omega}{\sqrt{T}}\right]} \quad (8)$$

and substituting Equation 7 in 8 obtains:

$$\frac{\Delta\phi}{\Delta T} \approx \frac{Kl\omega}{2K_1 T^{3/2}} \quad (9)$$

Combining Equations 9 and 7

$$\frac{\Delta\phi}{\Delta T} \approx \frac{n\pi}{4TK_1} \quad (10)$$

Equation 7 indicates that the output of the phase discriminator is a zero differential pressure whenever the medium surrounding the temperature sensor 10 is at a known reference temperature. Deviation of the temperature from the reference value is indicated by an output pressure of the phase discriminator which is proportional to the phase displacement from 90° (or odd multiple thereof).

Equation 10 reveals that the accuracy or sensitivity $\Delta\phi/\Delta T$ of the temperature sensor 10 can be increased by using a large total phase shift through the tube 10, i.e., using large values of $n$. The sensor sensitivity is also a function of the impedance match between the sensor tube 10 and the input and output circuits associated therewith as indicated by $K_1$ in Equation 10. The line impedance $Z_c$ can be matched to the fluid circuitry such that $R_1$ or $R_2 = Z_c$ whereby $K_1$ is equal to unity.

Figure 2:
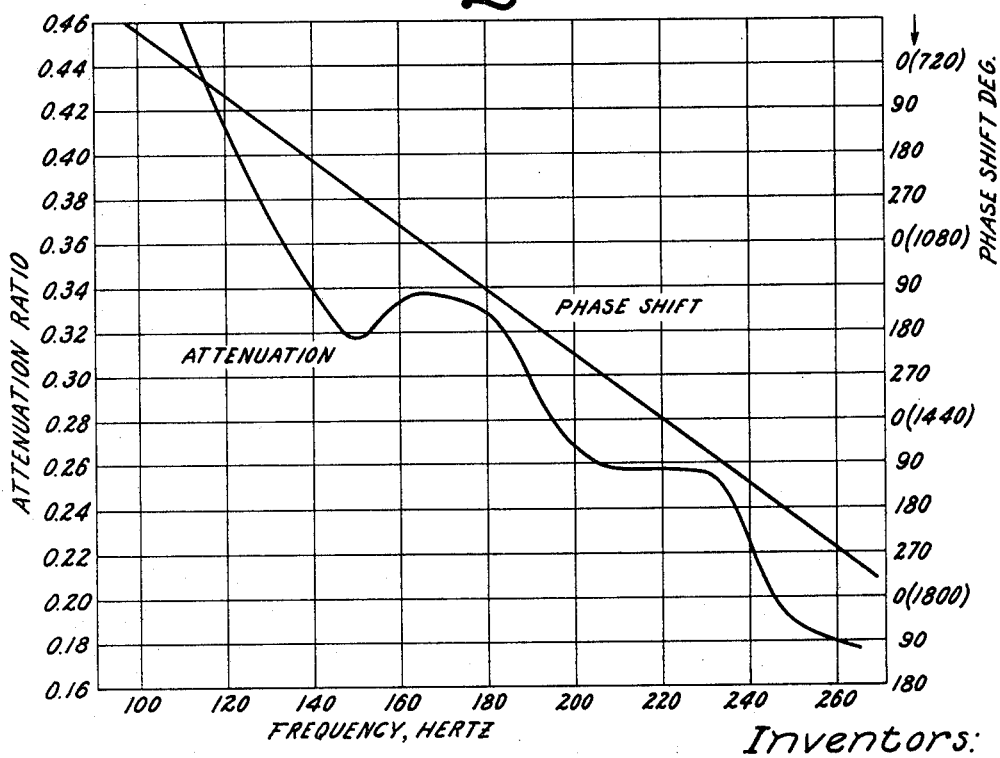
FIG. 2 is a graphical representation of the phase shift and attenuation of a sinusoidally pressurized fluid wave transmitted through a particular sensing tube versus oscillator frequency.

In general, $K_1$ can be made very nearly equal to unity as indicated in FIG. 2 which is a plot of measured phase shift and attenuation versus oscillator frequency for a 20 foot long tube, inner diameter of ¼ inch, at a temperature of approximately 70° F. The phase shift plot is a straight line even though the tube was intentionally mismatched to reduce the steady state flow losses therein. The frequency at which the 90° phase shift points occur is independent of $K_1$ as evident from Equation 7 and, therefore, mismatching does not affect the frequency at which the system null occurs. The plot of FIG. 2 is over the frequency range of 100–260 hertz and the attenuation ratio and phase shift are likewise plotted only over a limited range corresponding to the frequency range.

As mentioned above, fluidic phase discriminator circuit 17 provides a differential pressure output signal of the analog type having a magnitude varying directly with the magnitude of the displacement of the phase shift from 90° or odd multiple thereof. Phase discriminator 17 is comprised of two single-receiver fluidic rectifiers 20, 21 and a decoupler component comprising a conventional two-receiver fluid amplifier 22, restrictors 25 and 26 providing fluid flow resistances and volume 27 providing a fluidic capacitance to fluid flow therethrough. The phase discriminator also includes a fluidic low pass filter comprising a long thin tubing 23 providing inductance to fluid flow therethrough and fluidic capacitor 24 in each of the output lines of our system.

The decoupler component comprising elements 22, 25–27 converts the single-ended pressure signal at the second end 18 of sensing tube 10 into a differentially pressurized (push-pull) signal as a result of the alternating component of the signal being filtered out in the control input branch containing the RC low pass filter 26, 27, while passing through the second control input branch containing restrictor 25 with substantially no attenuation. The D.C. pressure components of the signal are attenuated equally in both control input branches due to equal size restrictors 25 and 26 and are cancelled out in their equal deflection of the power jet in amplifier 22. Thus, only the A.C. component (i.e., a sinusoidally varying signal) is passed to the receivers of amplifier 22, and provides a push-pull signal thereat.

Figure 3:
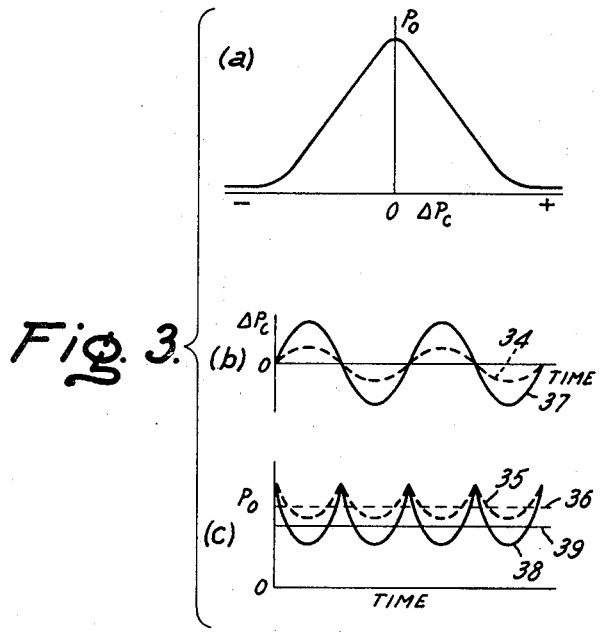
FIGS. 3a, 3b, 3c are graphical representations of the input-output characteristics of a fluidic rectifier device utilized in the phase discriminator circuit of our invention.

The single-receiver fluidic rectifier elements 20, 21 utilized in the phase discriminator 17 have the input-output characteristics illustrated in FIG. 3. The receiver is located on the centerline axis of the rectifier defined by the power fluid nozzle and provides a unipolarity output. A net positive or negative pressure control signal applied across the control fluid nozzles causes a decrease in the output pressure $P_o$ in the receiver compared to the condition when no net signal is applied and the power jet is directed along the centerline axis. This characteristic of rectifier output pressure $P_o$ versus net control input signal $\Delta P_c$ is illustrated in FIG. 3a. The input-output wave form characteristics of the rectifier element are illustrated in FIGS. 3b and 3c wherein FIG. 3b illustrates the net control input signal $\Delta P_c$ versus time in terms of small amplitude 34 and large amplitude 37 sinusoidally varying signals. FIG. 3c illustrates the output pressure $P_o$ wave forms versus time corresponding to input signals 34 and 37. Thus, a control input pressure wave having a small amplitude 34 provides an output pressure wave 35 having corresponding small variations in pressure and relatively high average output pressure 36. In like manner, a control input pressure wave having a large amplitude 37 provides an output pressure wave 38 having greater pressure excursions and a lower average output pressure. Thus, the average pressure magnitude of the rectifier output is inversely proportional to the amplitude of a variable input signal.

Figure 4:
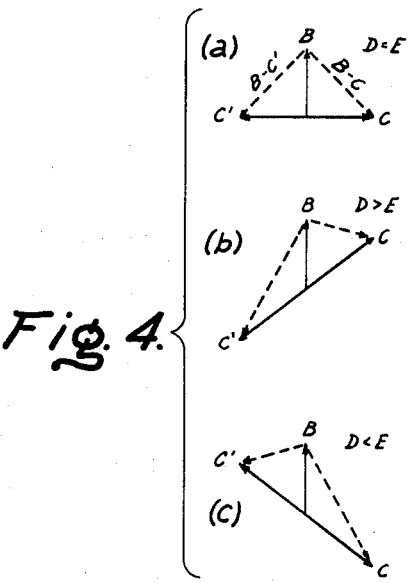
FIGS. 4a, 4b, 4c are vector diagram representations of the operation of the phase discriminator circuit.

The operation of the phase discriminator circuit 17 is illustrated with reference to FIGS. 1 and 4 where a push-pull signal (C–C') is compared in phase to a single-ended signal B. Signal B corresponds to the input pressure wave signal applied to sensing tube 10 at the first end 14 thereof, and also to first control fluid nozzles of rectifiers 20 and 21. Push-pull signal (C–C') corresponds to the output of decoupler 22 applied to second control fluid nozzles of rectifiers 20 and 21. The comparison of the phases of these two signals is, for all practical considerations, equivalent to a comparison of the phase shift $\phi$ across sensing tube 10. The pair of LC low pass filters 23, 24 are utilized in the output circuits of rectifiers 20 and 21 to provide an average output pressure signal $\Delta P$ designated D, E in the output lines of rectifiers 20, 21, respectively.

FIG. 4a reprehsents the vector diagram for the case wherein a 90° phase relation is established between signals (C–C') and B. Under this condition, the respective rectifier inputs (B–C and B–C') are equal and thus output D equals output E and the output signal $\Delta P$ is zero. FIGS. 4b and 4c illustrate other phase relations in which output D is respectively greater and less than output E. These latter two conditions provide an output $$\Delta P = (D - E)$$

which is positive and negative, respectively. Thus, the phase discriminator circuit provides an output analog signal having a differential pressure magnitude proportional to the phase displacement from 90° of two input signals, the output being zero when the input signals are 90° out of phase. For the cases of the input signals being greater or less than 90° out of phase, a positive or negative output results. Maximum positive and negative output pressures $\Delta P$ occur when the phase shift across sensor tube 10 is 180° and 0°, respectively.

Figure 5:
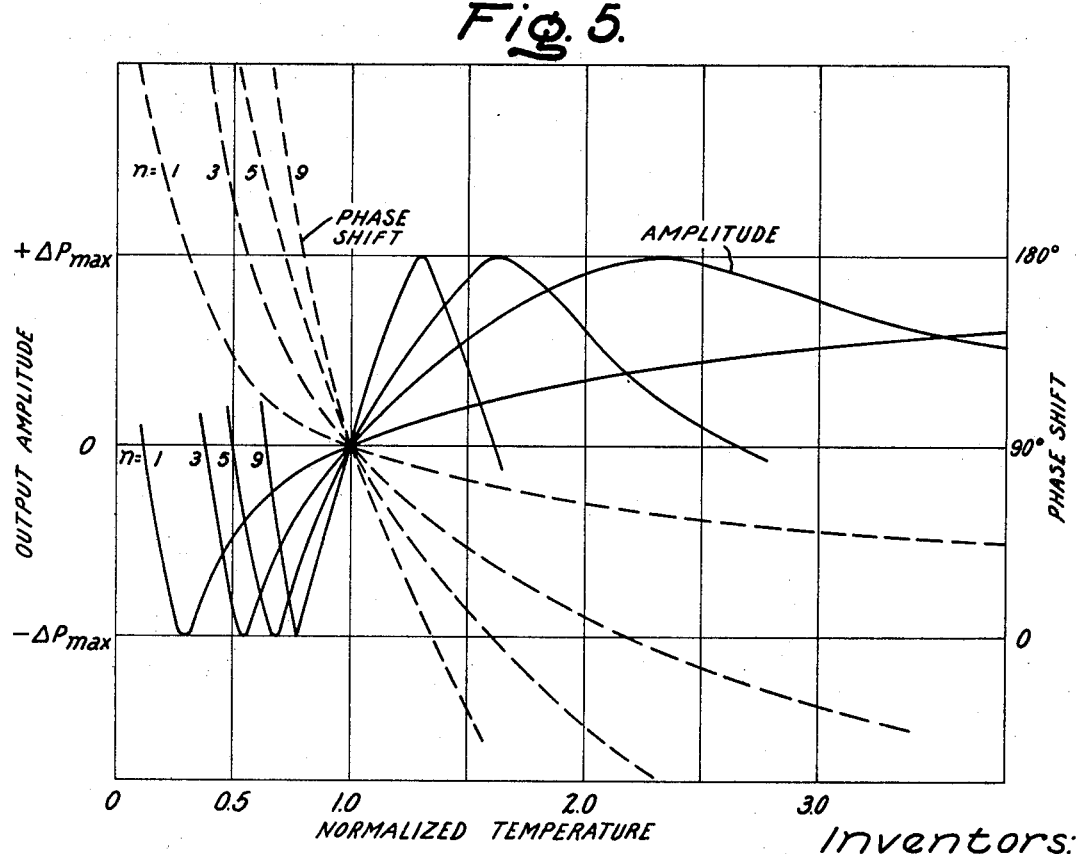
FIG. 5 is a graphical representation of a family of curves illustrating the sensitivity and temperature ranges obtained with our temperature sensor for various values of $n$.

As described with reference to Equation 10, the sensitivity or accuracy of the temperature sensor is increased by operating with large values of $n$. However, the temperature range of operation decreases with increasing $n$ since the phase discriminator output reverses polarity when the relative phase shift exceeds 180° or becomes a negative angle. FIG. 5 indicates the increased sensitivity $\Delta \phi / \Delta T$ and decreased temperature range with increasing $n$. FIG. 5 is a plot of the phase discriminator differential pressure output amplitude $\Delta P$ and the relative phase shift $\phi$ versus a normalized temperature for different values of $n$ or total phase shift. The value of 1.0 on the temperature scale represents the reference temperature. The high sensitivity and inherently accurate modes of system operation corresponding to large values of $n$ have limited temperature range and limited capacity to cope with large step changes in temperatures as indicated by the discriminator output $\Delta P$ (AMPLITUDE) polarity reversal and corresponding 0° or 180° crossing of the phase shift curves. The single mode system illustrated in FIG. 1 is thus generally designed for operation with a value of $n$ which is a compromise between the high sensitivity obtained with large values of $n$, and the wide temperature range of operation obtained with $n=1$.

Figure 6:
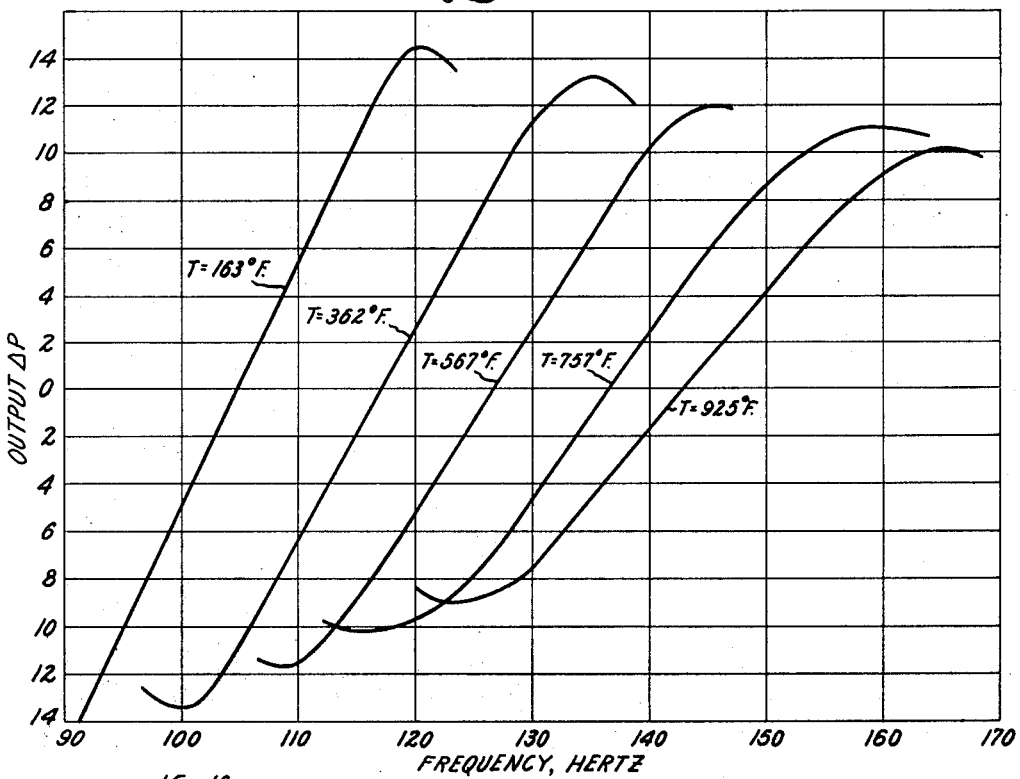
FIG. 6 is a graphical representation of a family of curves of the output pressure of the fluidic system versus the oscillator frequency for various constant temperatures.

The output characteristics of the sensor and phase discriminator operating at $n=7$ is illustrated in FIG. 6 which depicts a family of curves of the output pressure $\Delta P$ of the phase discriminator in inches of water versus the oscillator frequency for various constant temperatures of the medium surrounding tube 10. The characteristics were obtained for a stainless steel temperature sensing tube 10 having a 20 foot length, outer diameter of ¼ inch and wall thickness of 0.01 inch. Sensing tube 10 was mounted inside a furnace with the phase discriminator circuitry being outside the furnace such that a small part of the sensing tube was also outside the furnace. Each curve is for a constant furnace temperature with the excitation frequency being a variable since it is simpler to obtain this data than to make the temperature variable. The test results indicate a decrease in gain at elevated temperatures caused primarily by bias changes in the phase discriminator circuit which can be eliminated, if desired, by adding a decoupling network between the phase discriminator and the oscillator. The decreased gain does not directly effect the sensor null although it does impose more stringent bandwidth requirements to satisfy system stability requirements over the temperature range. The section of the sensing tube outside the furnace results in the sensor detecting a lower temperature than the furnace temperature and illustrates the capability of functioning as a temperature averaging device 17a.

Figure 7:
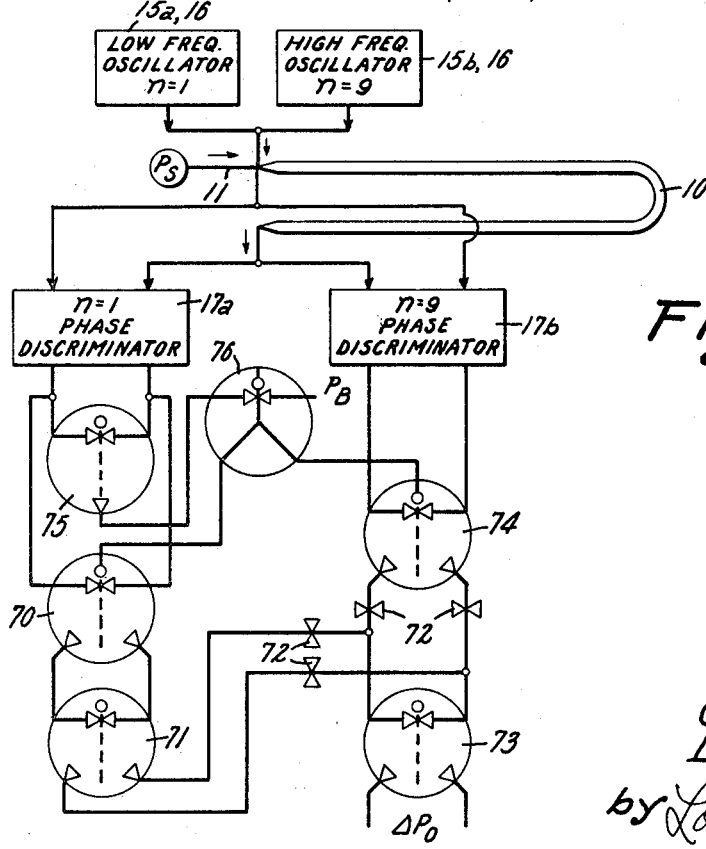
FIG. 7 is a schematic representation of a dual mode fluidic temperature sensing system constructed in accordance with our invention.

A dual mode system illustrated in FIG. 7 is utilized to obtain advantage of the high sensitivity associated with large values of $n$ while still providing a broad temperature range of operation. The dual mode temperature sensor includes a constant low frequency fluidic oscillator 15a and power amplifier 16 for providing operation at $n=1$, and also a constant high frequency fluidic oscillator 15b and power amplifier 16 for system operation at a large value of $n$, and for explanatory purposes at $n=9$. The outputs of the two power amplifiers 16 are connected to the juncture of preheater tube 11 and sensing tube 10 to excite the heated pressurized fluid transmitted through tube 10 at the two frequencies generated by the two oscillators. At the second end of sensing tube 10, are connected two phase discriminator circuits 17a and 17b, each phase discriminator including the elements 20–27 illustrated in FIG. 1. The volumes 27, and possibly the restrictors also, in the RC low pass filters of the control input circuits of the decoupler components in the two phase discriminator circuits are of different size consistent with the two oscillator frequencies. In like manner, the LC low pass filters 23, 24 in the output circuit of the two phase discriminators are also comprised of different size elements consistent with the oscillator frequencies.

The two mode system of FIG. 7 thus comprises a low gain circuit including the low frequency oscillator 15a and associated $n=1$ phase discriminator 17a and a parallel high gain circuit including high frequency oscillator 15b and $n=9$ phase discriminator 17b. The high gain circuit maintains control whenever the temperature deviation (error) is within a predetermined limit, and the low gain circuit assumes control only when the error is outside such limit. The low gain circuit further includes two stages of amplification comprised by conventional two-receiver analog type fluid amplifiers 70 and 71. The control nozzles of amplifier 70 are connected to the output of phase discriminator 17a and the output of amplifier 71 is connected through summing resistors 72 to the control nozzles of the output amplifier stage 73. In like manner, the high gain circuit further includes one stage of amplification comprised by amplifier 74 having its control nozzles connected to the output of the phase discriminator 17b and the output receivers thereof coupled to the control nozzles of output stage 73 through summing resistors 72. As indicated in FIG. 5, the sensitivity or gain of the $n=9$ sensor is very much greater than the gain of the $n=1$ sensor, and for this reason the low gain circuit includes an additional stage of amplification in order to increase the gain of the low gain circuit although still maintaining the overall gain thereof considerably less than that of the high gain circuit. Amplifiers 74 and 75 are not constantly supplied with pressurized power fluid as in the case of the other fluid amplifiers in our system.

The output of the $n=1$ phase discriminator circuit 17a is also applied to the control nozzles of a single-receiver rectifier 75, and the output of rectifier 75 is applied to a control nozzle of a digital type fluid amplifier 76 which may be an OR-NOR or a biased flip-flop functioning as a mode selector. Mode selector 76 is biased by means of control pressure $P_B$ such that whenever the temperature error is within a predetermined limit set by bias pressure $P_B$ applied to a control nozzle of element 76, the output of 76 is directed to the power nozzle of amplifier 74. As indicated with respect to FIG. 3a, the output of rectifier 75 decreases whenever the absolute value of the output $\Delta P$ of the low gain discriminator 17a increases, i.e., when a temperature deviation from the reference temperature increases. At the preselected pressure magnitude $P_B$ corresponding to a preselected temperature error, the output of rectifier 75 has decreased sufficiently to switch the state of digital element 76 which thereby removes the power fluid supply from (amplifier 74) the high gain circuit and applies it to (amplifier 70) the low gain circuit which maintains control until discriminator 17a output has decreased sufficiently to switch control back to the high gain circuit. Our dual mode system thus operates with the inherently high gain of the $n=9$ circuit during normal conditions, and switches to the lower gain, wider temperature range only during conditions of abnormally high temperature error or change.

The time constant of the long tube sensor 10 is a function of the internal and external heat transfer conductances thereof. When the sensor is employed to measure the temperature of low velocity fluids, the time constant may be in the order of several seconds. The response time to large changes in temperature is reduced by employing the circuit illustrated in FIG. 8 wherein a Helmholtz oscillator 80 is utilized as a secondary temperature sensor. A Helmholtz resonator comprises the feedback element in fluidic oscillator 80 and the entire oscillator circuit is immersed in the medium whose temperature is being measured. The frequency of oscillation of the Helmholtz oscillator is proportional to the square root of the fluid temperature inside the resonator. Although the Helmholtz oscilllator is not a highly accurate temperature sensor, this factor is minimized since the Helmholtz oscillator is in the branch of the system which assumes control only in the presence of large errors associated with large temperature transients, and during small errors control is maintained by the high value $n$ branch as in the case of FIG. 7.

The time constant of the Helmholtz oscillator is approximately equal to the purge time of the resonator which is typically in the order of ¼ second or less depending on the stream velocities, and thus the Helmholtz oscillator has the advantage of reducing the response time to large changes in temperature. The branch of the system including the Helmholtz oscillator 80 has an unlimited temperature discrimination range and therefore performs the same function as the $n=1$ circuit in FIG. 7.

The output of temperature-sensitive Helmholtz oscillator 80 is connected to a fluidic frequency-to-analog converter 81 of a type such as described in U.S. patent application Ser. No. 499,403, now Pat. No. 3,409,032 entitled "Fluid-Operated Frequency Sensing Converter Circuit," inventors Boothe et al. and assigned to the same assignee as the present invention. The output of temperature-insensitive constant high frequency oscillator 15b provides excitation and operation of temperature sensing tube 10 with a large value of $n$, such as $n=9$, and is also applied to a second frequency-to-analog converter 82. The variable pressure output of converter 81 corresponding to the variable frequency of oscillator 80 is compared to the constant pressure output of converter 82 corresponding to the constant frequency output of oscillator 15b in single-receiver rectifier 83 by being applied to the opposing control nozzles thereof. The two frequency-to-analog converters are of identical design so that they will tend to track and minimize errors induced by power fluid supply pressure variations and circuit temperature changes. The pressure differential existing between the two converter outputs which is impressed across the control nozzles of rectifier 83 is proportional to the difference between the reference temperature and the temperature sensed by the Helmholtz resonator. When this difference or error exceeds a selected limit, determined by bias pressure $P_B$ of mode selector 76, control is switched from the high gain long tube sensor to the fast response, broad temperature range Helmholtz sensor by means of mode selector 76 as in the case of the FIG. 7 embodiment.

From the foregoing, it is readily apparent that the objectives set forth have been met. Thus, our invention provides a fluidic temperature sensing system which is immune from contamination by the environment, such as combustion by-products, due to the fluid utilized in the sensor and preheater tubes and fluidic circuitry being isolated from the medium whose temperature is to be measured, and the characteristics of fluid amplifiers having no moving mechanical parts and being relatively insensitive to shock, vibration and temperature effects. These characteristics of fluid amplifiers and the use of a long line sensor tube result in a system of simple construction and high reliability. The long length of sensor tube 10 is adapted for measuring an average temperature in a relatively large region and the maximum temperature that can be measured is limited by the material from which tube 10 is fabricated. It is believed obvious that modification and variation of our invention is possible in light of the above teachings. Thus, since the pressure output of the phase discriminator is proportional to the difference of the average temperature in the sensor tube and a temperature reference determined by the excitation frequency and length of sensor tube, the results obtained with the dual mode system illustrated in FIG. 7 can also be achieved by utilizing only one oscillator exciting two sensor tubes 10 of different length. It is, therefore, to be understood that changes may be made in the particular embodiments of our invention described which are within the full intended scope of the invention.

What we claim as new and desire to secure by Letters Patent of the United States is:

1. A fluidic temperature sensing system adapted for measuring an average temperature and comprising:
   a relatively long first tube disposed in a region whose average temperature is to be measured,
   means for supplying a variable pressurized fluid wave signal including a constant pressure component and an alternating pressure component to a first end of said first tube, the means supplying the constant pressure component comprising a second tube disposed in the region, a first end of said second tube supplied from a source of constant pressurized fluid, the second end of said second tube connected to a first end of said first tube, said second tube of length sufficient for heating the fluid therein at the second end thereof to substantially the temperature in the region whereby the temperature of the fluid in said first tube is independent of its initial temperature, and
   means for detecting the phase shift of the pressure wave signal in being transmitted through said first tube, the phase shift across the ends of said first tube being proportional to the average temperature in the region, the fluids utilized in said first and second tubes being isolated from the medium in the region whereby the sensing system is not subject to contamination therefrom.

2. The fluidic temperature sensing system set forth in claim 1 wherein said phase shift detecting means comprise:
   a fluidic phase discriminator circuit having no moving mechanical parts and characterized by an output pressure null whenever a 90° phase shift or odd multiple thereof occurs across the ends of said first tube, the output pressure increasing differentially with increased deviation of the measured temperature from a reference temperature corresponding to the pressure null, and further comprising:
       means for converting the pressure wave signal at the second end of said first tube from a single-ended pressure signal to a differential pressurized signal.

3. The fluidic temperature sensing system set forth in claim 1 wherein:
   the means supplying the alternating pressure component comprises a constant frequency fluidic oscillator having its output in communication with the first end of said first tube, the output of said oscillator being an alternating pressure variation of substantially sinusoidal wave form.

4. The fluidic temperature sensing system set forth in claim 3 wherein:
   said phase shift detecting means is characterized by an output pressure null whenever a 90° phase shift or odd multiple $n$ thereof occurs across the ends of said first tube, the output pressure increasing differentially with increased deviation of the measured temperature from a reference temperature, the pressure null being determined by the length of said first tube, the oscillator frequency and the reference temperature, the sensitivity of said system and the temperature range of operation thereof respectively increasing and decreasing, with increasing values of $n$.

5. The fluidic temperature sensing system set forth in claim 4 wherein:
   the peak magnitude of the sinusoidal alternating component of the pressure wave signal is less than the magnitude of the constant pressure component.

6. The fluidic temperature sensing system set forth in claim 4 wherein:
   said phase shift detecting means comprise a fluidic phase discriminator circuit, and
   means for converting the pressure wave signal at the second end of said first tube from a single-ended pressure signal to a differential pressurized signal.

7. The fluidic temperature sensing system set forth in claim 6 wherein said phase discriminator circuit comprises:
   a pair of active fluidic rectifiers, each rectifier comprising:
       a power nozzle for generating a constant pressurized power jet of fluid,
       a single receiver downstream of said power nozzle and aligned therewith, and
       a pair of opposed control nozzles for generating variable pressurized control jets of fluid in intersecting relationship with the power jet for proportional deflection thereof relative to said receiver,
   a first nozzle of each said pair of control nozzles in communication with the first end of said first tube for determining a reference for the phase of the pressure wave signal supplied thereto,
   a second nozzle of each pair of control nozzles in communication with said signal converting means for detecting the phase of the pressure wave signal at the second end of said first tube, and
   a pair of fluid flow passages connected to the receivers of said rectifiers and comprising the output of said system.

8. The fluidic temperature sensing system set forth in claim 7 and further comprising:
   first active analog-type fluid amplifier comprising:
       a power nozzle for generating a constant pressurized power jet of fluid,
       a pair of spaced receivers downstream of said power nozzle, and
       a pair of opposed control nozzles for generating variable pressurized control jets of fluid in intersecting relationship with the power jet for proportional deflection thereof relative to said receivers,
   the latter control nozzles in communication with the output of said fluidic oscillator,
   a first of said spaced receivers being vented,
   a second of said spaced receivers in communication with the first end of said first tube, said amplifier providing a power amplifying function for increasing the power level of the oscillator output sufficiently to apply the output thereof to the first end of said first tube and to the first control nozzles of said rectifiers.

9. The fluidic temperature sensing system set forth in claim 7 wherein said phase discriminator circuit further comprises:
   a fluidic low pass filter network in each of the pair of fluid flow passages connected to the receivers of said pair of rectifiers, each filter network comprising a long thin tubing forming a fluidic inductor and a volume forming a fluidic capacitor.

10. The fluidic temperature sensing system set forth in claim 7 wherein:
said signal converting means comprise:
a second active analog-type fluid amplifier comprising:
a power nozzle for generating a constant pressurized power jet of fluid,
a pair of spaced receivers downstream of said power nozzle, and
a pair of opposed control nozzles for generating variable pressurized control jets of fluid in intersecting relationship with the power jet for proportional deflection thereof relative to said receivers,
a first of the latter control nozzles in communication with the second end of said first tube through a first fluid flow restrictor,
a second of the latter control nozzles in communication with the second end of said first tube through a fluidic low pass filter network comprising a second fluid flow restrictor and a third volume, and
the latter pair of spaced receivers in communication with the second control nozzles of said rectifiers.

11. The fluidic temperature sensing system set forth in claim 4 and further comprising:
a second constant frequency fluidic oscillator having its output in communication with the first end of said first tube,
means including a second phase shift detecting means for operating said system in dual mode, a first of said phase shift detecting means adapted for system operation at a lower value of $n$, and the second phase shift detecting means adapted for system operation at a higher value of $n$, the ratio of the two oscillator frequencies being equal to the ratio of two values of $n$, and
mode selector means for maintaining control of system operation by said second phase shift detecting means when the measured temperature is within a predetermined error limit about the reference temperature, and for switching control of system operation to said first phase shift detecting means only when the measured temperature changes sufficiently to be outside the predetermined error limit.

12. The dual mode fluidic temperature sensing system set forth in claim 11 wherein:
said mode selector means comprises a digital type fluid amplifier having a first control nozzle in communication with the output of said first phase shift detecting means and an opposed second control nozzle supplied with a bias pressure corresponding to the predetermined temperature error limit, the fluid receivers of said digital amplifier in communication with the power nozzles of two fluid amplifiers connected to the outputs of said first and second phase shift detecting means whereby only one of the latter amplifiers is supplied with power fluid at any instant of time to determine the system mode of operation.

13. The fluidic temperature sensing system set forth in claim 4 and further comprising:
a temperature-sensitive fluidic oscillator disposed in the region to be measured for providing a secondary temperature sensor function and system operation at the lower value of $n$, said constant frequency oscillator operable at a relatively high frequency corresponding to the higher value of $n$ system operation,
means in communication with the outputs of said temperature-sensitive oscillator and said constant frequency oscillator for comparing the constant frequency oscillator output corresponding to the reference temperature with the temperature-sensitive oscillator output coresponding to the temperature sensed by the temperature-sensitive oscillator, and
mode selector means for maintaining control of system operation by said phase shift detecting means when the temeprature sensed by said temperature-sensitive oscillator is within a predetermined error limit about the reference temperature, and for switching control of system operation to said temperature comparing means only when the sensed temperature is outside the predetermined error limit, the response time of system operation with said temperature comparing means being considerably faster than with system operation with said phase shift detecting means.

14. The dual mode, fast response fluidic temperature sensing system set forth in claim 13 wherein:
said mode selector means comprises a digital type fluid amplifier having a first control nozzle in communication with the output of said temperature comparing means and an opposed second control nozzle supplied with a bias pressure corresponding to the predetermined temperature error limit, the fluid receivers of said digital amplifier in communication with the power nozzles of two fluid amplifiers connected to the outputs of said phase shift detecting means and said temperature comparing means whereby only one of the latter amplifiers is supplied with power fluid at any instant of time to determine the system mode of operation.

15. The dual mode, fast response fluidic temperature sensing system set forth in claim 13 wherein said temperature comparing means comprise:
a pair of identical fluidic frequency-to-analog converters connected to the outputs of said constant frequency oscillator and said temperature-sensitive oscillator for converting the frequency signals thereof to analog signals each having a pressure magnitude corresponding to the oscillator frequency, and
an active fluidic rectifier comprising:
a power nozzle for generating a constant pressurized power jet of fliud,
a single receiver downstream of said power nozzle and aligned therewith, and
a pair of opposed control nozzles for generating variable pressurized control jets of fluid in intersecting relationship with the power jet for proportional deflection thereof related to said receiver,
said pair of control nozzles in communication with the outputs of said pair of frequency-to-analog converters.

16. A fluidic temperature sensing system comprising:
a temperature sensor comprising a first tube disposed in a medium whose temperature is to be measured, said first tube of sufficient length for heating a pressurized fluid therein to approximately the temperature of the surrounding medium by heat transfer therefrom,
means including a fluidic oscillator for supplying a single-ended fluid pressure wave signal to a first end of said first tube, the signal characterized by a constant pressure component and a sinusoidal varying component,
means connected to a second end of said first tube for converting the single-ended pressure signal thereat to a differential pressure signal wherein only the sinusoidally varying component is present,
a fluidic phase discriminator circuit connected to the first end of said first tube and the output of said signal converting means for comparing the phases of the pressure wave signal across the two ends of said first tube and thereby detecting any phase shift therebetween, the output of said phase discriminator circuit characterized by an output pressure null corresponding to a 90° phase shift $\phi$ or odd multiples $n$ thereof across the ends of said first tube, the pressure null being determined by the length $l$ of the first tube, the oscillator frequency $\omega$ and a reference temperature $T$ whereby a particular pressure null corresponds to a known reference temperature, the output pressure of said phase discriminator increasing differentially with increased deviation of the measured temperature from the reference temperature within a temperature range determined by the value of $n$, the temperature range decreasing and the sensitivity of the temperature sensor increasing with increasing values of $n$.

17. The fluidic temperature sensing system set forth in claim 16 and further comprising:
 a second tube disposed in the medium whose temperature is to be measured, said second tube supplied from a source of constant pressurized fluid to thereby provide the constant pressure component of the pressure wave signal, said second tube of length sufficient for heating the fluid therein to substantially the temperature of the surrounding medium whereby the temperature of the fluid in said first tube is independent of its initial temperature,
 a fluidic low pass filter network connected in the output of the phase discriminator circuit for providing the discriminator circuit output signal as an average differential output signal, and
the pressure null being determined by the equation $$\frac{n\pi}{2} = \frac{Kl\omega}{\sqrt{T}}$$

References Cited

UNITED STATES PATENTS 3,302,398    2/1967    Taplin et al.    137—81.5
3,349,614    10/1967    Parker    73—194

LOUIS R. PRINCE, Primary Examiner

D. E. CORR, Assistant Examiner

U.S. Cl. X.R.

73—357; 137—81.5